(12) United States Patent
Terreault et al.

(10) Patent No.: US 7,142,609 B2
(45) Date of Patent: Nov. 28, 2006

(54) METHOD AND APPARATUS FOR DETECTING AND QUANTIFYING IMPAIRMENTS IN QAM SIGNALS

(75) Inventors: Gerard Terreault, Pierrefonds (CA); Jean Lewis, Laval (CA)

(73) Assignee: Sunrise Telecom Incorporated, San Jose, CA (US)

( * ) Notice: Subject to any disclaimer, the term of this patent is extended or adjusted under 35 U.S.C. 154(b) by 795 days.

(21) Appl. No.: 09/841,837

(22) Filed: Apr. 26, 2001

(65) Prior Publication Data

US 2002/0064233 A1 May 30, 2002

Related U.S. Application Data

(60) Provisional application No. 60/253,729, filed on Nov. 29, 2000.

(51) Int. Cl.
*H04L 5/12* (2006.01)

(52) U.S. Cl. .................. 375/261; 375/298; 375/316

(58) Field of Classification Search ............ 375/10, 375/224, 324, 340, 252, 228, 349, 331, 332, 375/261, 269, 298, 316; 364/514, 521, 481; 370/241; 348/192, 180; 725/143; 702/58; 329/304
See application file for complete search history.

(56) References Cited

U.S. PATENT DOCUMENTS

| | | | |
|---|---|---|---|
| 4,381,546 A | | 4/1983 | Armstrong |
| 4,631,738 A | | 12/1986 | Betts et al. |
| 4,827,431 A | | 5/1989 | Goldshtein |
| 4,918,708 A | * | 4/1990 | Pottinger et al. ........... 375/228 |
| 5,321,726 A | | 6/1994 | Kafadar |
| 5,394,185 A | * | 2/1995 | Bernard ..................... 348/192 |
| 5,495,203 A | * | 2/1996 | Harp et al. ................. 329/306 |
| 5,751,766 A | * | 5/1998 | Kletsky et al. ............. 375/224 |
| 5,867,206 A | | 2/1999 | Voght et al. |
| 5,946,359 A | * | 8/1999 | Tajiri et al. ................ 375/331 |
| 5,987,069 A | | 11/1999 | Furukawa et al. |
| 6,041,076 A | | 3/2000 | Franchville et al. |
| 6,061,393 A | | 5/2000 | Tsui et al. |
| 6,151,559 A | * | 11/2000 | Williams ..................... 702/58 |
| 6,278,730 B1 | * | 8/2001 | Tsui et al. .................. 375/224 |
| 6,385,237 B1 | * | 5/2002 | Tsui et al. .................. 375/228 |
| 6,556,239 B1 | * | 4/2003 | Al-Araji et al. ............ 348/192 |
| 6,671,334 B1 | * | 12/2003 | Kuntz et al. ................ 375/340 |

OTHER PUBLICATIONS

CED, CCTA 1999 Western Show, Day One, Wednesday, Dec. 15 (http://www.cedmagazine.com/ws99day11.htm).*
Communications Technology, Feb. 2000, Marketplace (http://www.broadband-pbimedia.com/ct/acrchives/0200/0200market.htm).*

(Continued)

*Primary Examiner*—Temesghen Ghebretinsae

(57) ABSTRACT

A method for detecting and quantifying impairments of a received communication signal of a QAM data communication system represented by a plurality of ideal values. The method includes storing a statistically significant number of a plurality of received points of the signal for each ideal value corresponding to a plurality of groups of said plurality of ideal values. The received points are defined by an in-phase and a quadrature components in a coordinate system in which a first axis is the in-phase axis and a second axis is a quadrature axis. The components have corresponding ideal components from their respective ideal value. Each group corresponds to respective impairments and is specific to the same.

14 Claims, 8 Drawing Sheets

OTHER PUBLICATIONS

CED, Dec. 1999, New Products (http://www.cedmagazine.com/ced/9912/9912np.htm.*

Acterna, SDA-4040D, HFC Signal Analysis Meter and SDA-5000 Stealth Digital Analyzer, Copyright 2000.*

Sunrise Telecom, Avantron AT-2000RQ QAM Analyzer, Product Brochure.*

Agilent Technologies, Agilant 8594Q QAM Analyzer Product Note, 5965-4991, Copyright 1996, 2000.*

Knowledge-based techniques for fault detection in digital microwave radio communication equipment Brown, K.E. et al; Selected Areas in Communications, IEEE Journal on vol. 6, Issue 5, Jun. 1988 pp. 819-827.*

Understanding the measures of signal quality in DVB systems Trezise, M.J.; Broadcasting Convention, 1997. International Sep. 12-16, 1997 pp. 488-492.*

Testing multimedia transmission systems Fibush, D.K.; Design & Test of Computers, IEEE vol. 12, Issue 4, Winter 1995 pp. 34-44.*

* cited by examiner

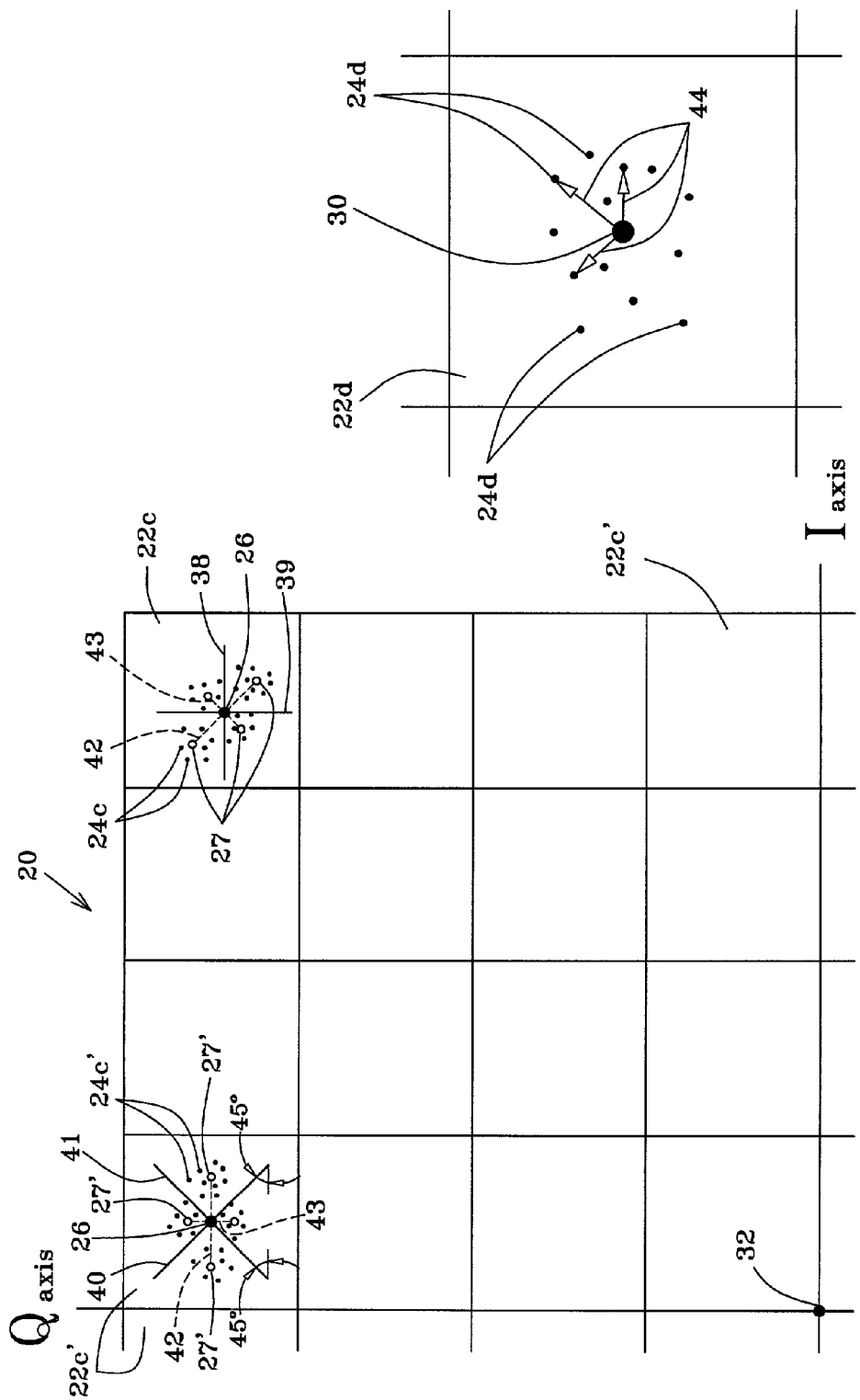

METHOD AND APPARATUS FOR DETECTING AND QUANTIFYING IMPAIRMENTS IN QAM SIGNALS

CROSS REFERENCE TO RELATED APPLICATION

This application is related to U.S. provisional application for patent Ser. No. 60/253,729 filed on Nov. 29, 2000.

FIELD OF THE INVENTION

The present invention relates to radio frequency (RF) communication signals and more specifically to a method and apparatus for detecting and quantifying impairments in quadrature amplitude modulation (QAM) signals.

BACKGROUND OF THE INVENTION

In the recent years, the Community Antenna TeleVision (CATV) network has evolved from an unidirectional analog system to a bi-directional, Hybrid Fiber Coaxial with a mix of analog and digital signals. The most common configuration comprises a fiber optic main distribution network associated with a local distribution network using coaxial cable. The downstream signals are a mix of analog modulated television and Frequency Modulation (FM) plus a few service signals in a band from 50 to 550 MHz, above 550 MHz digital modulated signals in the QAM-64 or QAM-256 are available, plus possibly a few auxiliary digital service signals around 50 to 200 MHz. All of these signals are normally continuous.

In the reverse or upstream path signal from 5 to 42 MHz, mostly digital signals in the Quadrature Phase Shift Keying (QPSK—QAM-4) or QAM-16 formats are used plus a few service signals in either analog or digital modulation. All of these signals are normally pulsed ON when required.

The multiplicity of digital signals induces a requirement to measure the quality of these signals. There have been two trends in performance measurement.

On the one hand, there is a multiplicity of test instruments with somewhat limited capability, i.e. measurement of total impairments (in the form of Modulation Error Ratio (MER) or its inverse Error Vector Magnitude (EVM)), error data rates in a few formats such as Bit Error Rate (BER) before and after standard Forward Error Correction (FEC), data packets loss, etc. Display of received signal in constellation format and Equalizer coefficients complemented these quantified measurements for analysis by the instrument operator.

On the other hand, there are a few instruments for laboratory use that are far more sophisticated but also much more of general purposes. The general configuration of these instruments is a raw signal recording followed by complete demodulation and analysis in software. The analysis will provide the same measurements in terms of MER/EVM but no BER within the format of digital television modulation, but BER Test using pseudo-random sequences. Measurements also include peak constellation deviation, average deviation, eye pattern, EVM variation in time, etc.

Being of general purposes laboratory instruments, these are large, not in-field intended, require elaborate set-up and very qualified personnel to interpret results. Also the cost of these instruments is many times that of the first category.

The operator of a transmission system uses an array of tools to diagnose the state of this channel. Each tool is focused on a specific aspect of the operation. Amongst that variety, we notice the constellation display of the received soft decisions. This is a visual display of the received signal in a quasi-analog fashion. The clusters of received symbols around ideal values provide an indication of impairments by their shape, their spread and their positions.

It takes a trained "eye" to diagnose the various impairments but it is nearly impossible to quantify them, also the occurrence of more that one impairment renders the analysis very difficult. There is then a need to analyze the constellation to extract and quantify impairments.

OBJECTS OF THE INVENTION

It is a general object of the present invention to provide a method and an apparatus for detecting and quantifying impairments in QAM signals that obviates the above noted disadvantages.

Another object of the present invention is to provide an apparatus for detecting and quantifying impairments in QAM signals that is simple for either in-field use or for unmanned monitoring of a CATV system at an affordable cost.

A further object of the present invention is to provide a method for detecting and quantifying impairments in QAM signals that is non-intrusive i.e. that leaves the signal uninterrupted during its operation.

Still another object of the present invention is to provide a method for detecting and quantifying impairments in QAM signals that provides accurate results enough for any general purposes evaluation of the signal.

Yet another object of the present invention is to provide a method for detecting and quantifying impairments in QAM signals that is simple in principle or methodology and requires only simple electronic instrumentation.

Other object of the present invention will become apparent from a careful reading of the detailed description provided herein, with appropriate reference to the accompanying drawings.

SUMMARY OF THE INVENTION

According to one aspect of the present invention, there is provided a method for detecting and quantifying impairments of a received communication signal of a quadrature amplitude modulation data communication system represented by a plurality of ideal values, said method comprises the steps of:

a) storing a statistically significant number of a plurality of received points of said signal for each of said ideal values corresponding to a plurality of groups of said plurality of ideal values, each of said received points being defined by an in-phase and a quadrature components in a coordinate system in which a first axis is an in-phase axis and a second axis is a quadrature axis, said components having corresponding ideal components from their respective of said ideal values, each of said groups corresponding to a respective of said impairments and being specific to the same;

b) analyzing said components of said received points of respective of said groups in relation with their respective of said ideal components of said ideal values to quantify said impairments of said signal and provide calculated values of the same;

c) displaying said calculated values of said impairments.

Preferably, the method further comprises, after step c), the following step of:

d) storing said calculated values of said impairments, thereby allowing an unmanned monitoring of said communication signal.

Preferably, the impairments are selected from a group including signal compression ratio, I/Q gain imbalance ratio, I/Q phase imbalance, phase noise, signal to noise ratio, signal to interference ratio and clipping level.

Preferably, the plurality of ideal values being distributed around an origin of said coordinate system in a plurality of adjacent rows and columns forming a square shape pattern, said rows and columns being in a direction of said in-phase axis and said quadrature axis respectively, said pattern defining four outer corner ideal values, external horizontal and vertical ideal values of said two outermost of said rows and two outermost of said columns respectively, internal ideal values in a center proximity of said origin, different combinations of said received points corresponding to respective of said defined ideal values forming said plurality of groups.

Preferably, the received points corresponding to respective of said four outer corner ideal values forming a first of said plurality of groups corresponding to said signal compression ratio impairment, said method, further comprises, after step b), the step of:

b1) determining for each of said four outer corner ideal values an average received point from the corresponding of said plurality of received points, a radial component of a vector going from corresponding of said outer corner ideal value to the corresponding average received point, and a signed average of said radial components, the ratio of the latter to a nominal distance from said origin to one of said outer corner ideal value being said signal compression ratio of said signal.

Preferably, the received points corresponding to respective of said external horizontal and vertical ideal values forming a second of said plurality of groups corresponding to said I/Q gain imbalance ratio impairment, said method, further comprises, after step b1), the steps of:

b2) determining for each of said external vertical ideal values an average received point from the corresponding of said plurality of received points, an in-phase component of a vector going from corresponding of said external vertical ideal value to the corresponding average received point, and a signed average of said in-phase components;

b3) determining for each of said external horizontal ideal values an average received point from the corresponding of said plurality of received points, a quadrature component of a vector going from corresponding of said external horizontal ideal value to the corresponding average received point, and a signed average of said quadrature components, a ratio of said signed average of said in-phase components to said signed average of said quadrature components being said I/Q gain imbalance ratio of said signal.

Preferably, the received points corresponding to respective of said external horizontal and vertical ideal values forming a second of said plurality of groups corresponding to said I/Q phase imbalance impairment, said method, further comprises, after step b3), the steps of:

b4) determining for each of said external horizontal ideal values an average received point from the corresponding of said plurality of received points, an in-phase component of a vector going from corresponding of said external horizontal ideal value to the corresponding average received point, and a second signed average of said in-phase components;

b5) determining for each of said external vertical ideal values an average received point from the corresponding of said plurality of received points, a quadrature component of a vector going from corresponding of said external vertical ideal value to the corresponding average received point, and a second signed average of said quadrature components, a ratio of said second signed average of said quadrature components to said second signed average of said in-phase components being a tangent value of said I/Q phase imbalance of said signal.

Preferably, the received points corresponding to respective of said four outer corner ideal values and two middle of each of said external horizontal and vertical ideal values forming a third of said plurality of groups corresponding to said signal phase noise impairment, said method, further comprises, after step b5), the steps of:

b6) determining for each of said four outer corner ideal values four sub-average received points of four subgroups from the corresponding of said plurality of received points, said four subgroups dividing the corresponding of said plurality of received points into four adjacent areas divided by two perpendicular lines respectively parallel to said in-phase and quadrature axis and intersecting each other at an average received point of the corresponding of said plurality of received points, said four sub-average received points forming two substantially tangential and radial segments of a respective ellipse having a respective length difference;

b7) determining for each of said middle ideal values four second sub-average received points of four second subgroups from the corresponding of said plurality of received points, said four second subgroups dividing the corresponding of said plurality of received points into four adjacent areas divided by two perpendicular lines respectively at a forty-five degree (45°) angle from said in-phase and quadrature axis and intersecting each other at a second average received point of the corresponding of said plurality of received points, said four second sub-average received points forming two substantially tangential and radial second segments of a respective ellipse having a respective second length difference, and a total average of all of said length and second length differences with said second length difference being increasingly weighted by essentially a square root of two factor, a ratio of said total average to the distance of one of said four corner ideal values to said origin being said phase noise of said signal.

Preferably, the received points corresponding to respective of said innermost ideal values forming a fourth of said plurality of groups corresponding to both said signal to noise ratio and signal to interference ratio impairments, said method, further comprises, after step b7), the steps of:

b8) determining for all of said innermost ideal values a distance between said plurality of received points and its corresponding of said innermost ideal values, a histogram distribution of said distances which substantially follows a normal distribution, and an average signal amplitude being an average of all distances of each of said plurality of said ideal values of said signal to said origin;

b9) statistically determining best match values of said histogram distribution with a plurality of predetermined standard deviations and offsets of a peak of a respective normal distribution from a zero distance to determine a true standard deviation ($\sigma$) and a true offset (A) by interpolating between said predetermined standard deviations and offsets around said best match values, ratios of said true standard deviation and said true offset to said average signal amplitude being said signal to noise ratio and said signal to interference ratio impairment of said signal respectively.

Preferably, in step b9), the best match values being statistically determined using a least mean square method, and said true standard deviation and true offset being determined using linear interpolation method.

Preferably, the fourth of said plurality of groups also corresponding to said clipping level impairment, said true standard deviation (σ) and true offset (A) corresponding to a true normal distribution, said method, further comprises, after step b9), the step of:

b10) determining a cumulative probability of occurrence of said distances being larger than a two true standard deviation (2σ) distance from a center of said true distribution, a true quantity of said occurrence, and a clipping ratio of said true quantity to said cumulative probability of occurrence, said clipping level being "clipping likely", "clipping" and "severe clipping" upon said clipping ratio between two and four, four and eight and larger than eight respectively. Preferably, the method is non-intrusive of said signal an adapted for an in-field signal detection at a receiver end of said data communication system, said statistically significant number being between eight thousand and sixteen thousand.

According to another aspect of the present invention, there is provided a method for detecting and quantifying parameters of a received communication signal of a quadrature amplitude modulation data communication system represented by a specific coding, said method comprises the steps of:

a) storing a statistically significant number of a plurality of operating parameters available and extracted from a signal demodulator of a receiver of said signal;

b) analyzing said plurality of operating parameters to quantify said signal parameters of said signal and provide calculated values of the same;

c) integrally displaying said calculated values of said signal parameters.

Preferably, the signal parameters are selected from a group including real baud rate, real carrier frequency, amplitude and group delay response, and low frequency disturbance (hum).

Preferably, the method further comprises, after step b), the steps of:

b1) counting a MPEG (Motion Picture Expert Group) stream word rate over a specific time duration of an order of magnitude of one second from said plurality of operating parameters;

b2) determining a signal user bit rate and consequently said real baud rate parameter of said signal using said MPEG word rate and said specific coding, said real baud rate impairment being accurate within an accuracy of a counter time base of said demodulator.

Preferably, the operating parameters include a control word and a control word dimensional factor, said method further comprises, after step b2), the steps of:

b3) performing a re-sampling of said operating parameters to recover an actual baud rate of said signal;

b4) determining said real carrier frequency parameter of said signal from said actual baud rate using a numerically controlled frequency generator having an output frequency being related to said actual baud rate by multiplying the latter (actual baud rate) by an average of said control word and dividing by said control word dimensional factor.

Preferably, the signal being filtered by an equalizer of said receiver of said data communication system to compensate for linear distortions of said signal using complex coefficients, said distortions being frequency responses, phase responses and reflections, said operating parameters further include said complex coefficients from said equalizer, said method further comprises, after step b4), the step of:

b5) determining said amplitude and group delay response parameter of said signal by calculating an amplitude and a phase from said frequency responses and a group delay from said phase responses of said equalizer respectively using said complex coefficients.

Preferably, the signal is related to a power line, the method further comprises, after step b5), the steps of:

b6) synchronizing a spectrum analyzer to said power line having a frequency and first harmonics being order of magnitude less than a frequency of said signal;

b7) sampling sequences of an amplitude of said signal with a resolution bandwidth of a same order of magnitude as said signal using a typical functionality of said spectrum analyzer;

b8) triggering said sequences to said frequency and first harmonics of said power line and averaging the same;

b9) determining said low frequency disturbance (hum) parameter of said signal by zooming on small amplitude modulation of said averaging to extract a peak-to-peak modulation.

Preferably, the peak-to-peak modulation varies between 0.1 percent and 15 percent.

Preferably, the method being non-intrusive of said signal an adapted for an in-field signal detection at said receiver, said statistically significant number being between twenty and two hundred.

BRIEF DESCRIPTION OF THE DRAWINGS

In the annexed drawings, like reference characters indicate like elements throughout.

FIG. 4b is an enlarged view showing the received points corresponding to two of the ideal values of FIG. 4a;

FIG. 5 is an enlarged view showing the received points corresponding to one of the ideal values related to the signal to noise ratio (wide band), signal to interference ratio (narrow band) and clipping level impairments;

DETAILED DESCRIPTION OF THE PREFERRED EMBODIMENTS

Figure 1:
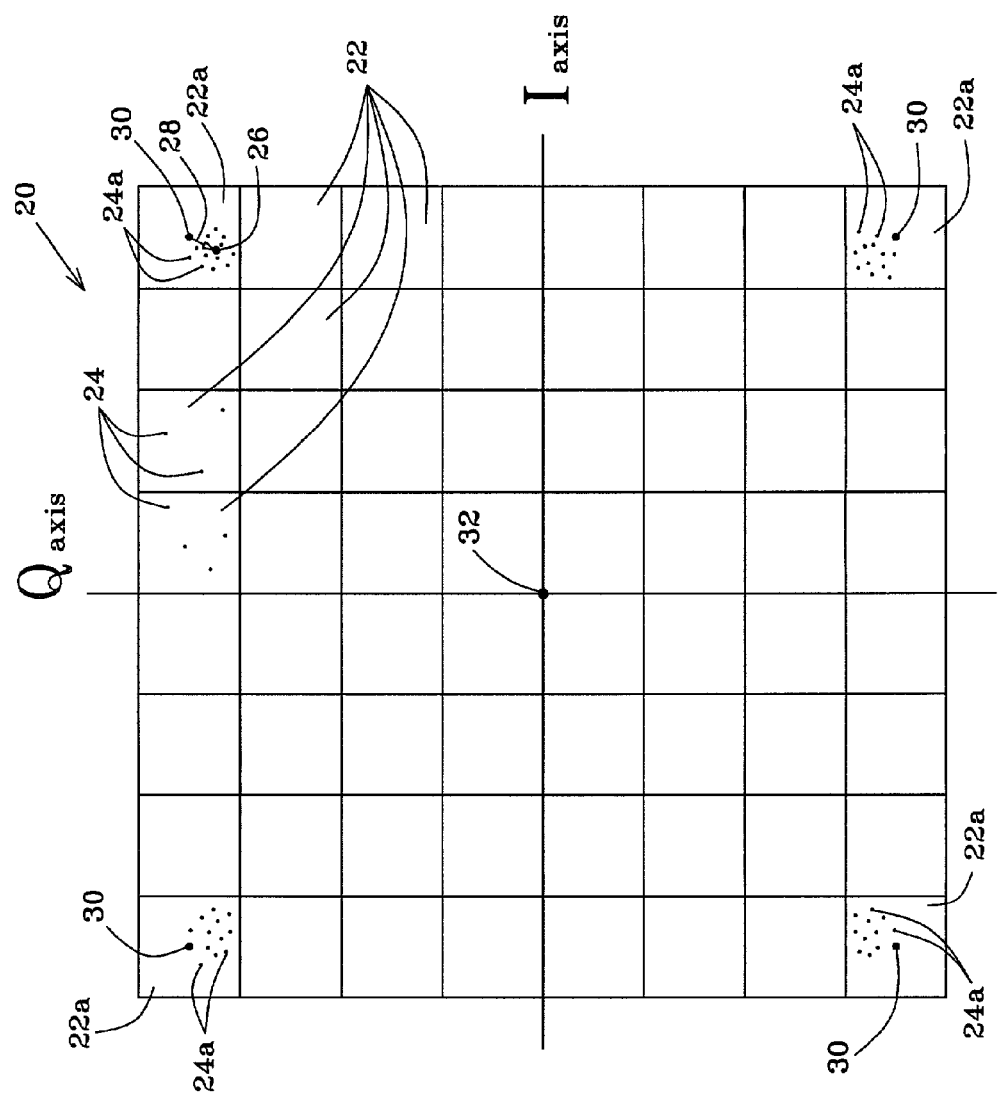
FIG. 1 shows an embodiment of a constellation display according to the present invention with the received points corresponding to the four (4) corner ideal values related to the signal compression ratio impairment.

With reference to the annexed drawings the preferred embodiments of the present invention will be herein described for indicative purposes and by no means as of limitation.

The following description is made with the high order quadrature amplitude modulation (QAM) signals in mind, but the underlying principles are applicable to other Digitally Modulated Signals (DMS) with appropriate modifications that are obvious to people familiar with the art.

Reference is made to specific modulation scheme and channel coding as used in the cable television environment.

Also, it is referenced to continuously modulated signals, but pulsed (or bursty) signals could be similarly analyzed; the only difference is in the collection of data, whereas in the former case it can be collected at any time once the receiver has acquired the signal, in the latter condition the period of time for acquisition of signal and collection of data is restricted.

Consequently, the following focuses on downstream continuous QAM-64 and QAM-256 signals.

The signal analyzers and receivers for digitally modulated signals are usually made of two major functional entities.

At first the signal is processed in the "analog" world and afterward in the "digital" world.

In the "analog" world the signal is effectively sampled and digitized by an Analog-to-Digital (A/D) converter to facilitate the processing and analysis. Nevertheless the processing is analog-like with filters, Phase Locked Loops (PLL) acting on the digitized analog signal.

The interface between analog and digital worlds takes place where a "decision" is taken on the "value" of the signal and consequently the digital word conveyed by the signal.

Digital processing is then concerned with the channel coding (such as error detection and correction) as well as data format (data streams and protocols).

Analog Processing

This analog processing includes the following: carrier frequency and phase recovery, symbol clock recovery and equalizer filter.

The carrier frequency and phase recovery function is to regenerate a receiver carrier signal that is locked in phase and frequency to the carrier of the source signal even though the modulation scheme contains only the modulated signal without residual carrier. In complex modulation such as QAM, the modulated carrier constantly varies in amplitude and phase with the modulation content.

The symbol clock recovery function is to regenerate a receiver clock that is synchronized with the received symbols or modulation data in order to sample the incoming signal at the optimum time when the data is "valid" and not during the transition between two received symbols.

The equalizer function is a time linear filter, using past and future samples (relative to the reference sample) that are added to the reference sample through complex multipliers. Normally the coefficients of the multipliers are adaptively determined to minimize the Inter-Symbol Interference. This effectively compensates for linear distortion of the signal (frequency response, phase response and reflections).

Once the carrier and the symbol clock are recovered (the equalizer is optional, but normally used) the sampled and digitized input signal can be demodulated. In the typical example of complex modulation such as QAM, the demodulated signal will take a complex value, given along two, preferably orthogonal, axes known as In-phase and Quadrature (relative to the reference carrier) referring to standard X & Y axes respectively. The amplitudes in these two axes are referred to the Soft Decision (SD) values. They are frequently displayed in an I-Q plane known as constellation of a square pattern.

Digital Demodulation

The original source signal takes specific ideal values with corresponding ideal components in the I and Q axes according to the transmitted code, but the received signal deviates from the ideal value because of impairments: distortions (non-linear plus linear), by noise, by interference, etc. Hence the receiver has to make a decision about the transmitted value based on the received value (or point). As there are specific transmitted values, one can set boundaries between adjacent ideal values. A complex received value (or point) then falls in one of the regions between boundaries and then assigned the ideal value corresponding to the center between boundaries. The transmitted code is extracted from these decisions. If the impairments in the channel were large enough, so that the received value (or point) deviates sufficiently to cross one's boundary and correspond to a different code than the transmitted one, there is an error in reception.

The digital demodulation in many instances has further steps of processing to minimize transmission errors. Amongst the latter, there are "trellis" coding, FEC using Reed Solomon codes as well as interleaving that spread a cluster of errors into a large number of small errors that FEC will easily correct.

Non-linear Transmission Channel Impairments

There is a multiplicity of impairments in the transmission channel from the source through the media to the receiver.

The following are serious impairments: compression (non-linear gain at any point in the chain), I/Q Gain imbalance (difference between the In-phase and Quadrature path in the modulator), I/Q phase imbalance (the phase difference between the In-phase carrier and the Quadrature carrier in the modulator is not exactly ninety degrees (90°)), Phase Noise (jitter in the carrier or in the oscillators of any frequency conversion), Noise (additive thermal noise from any active device or wide band interferer with noise-like characteristic), Narrow band interferer (an interference signal whose occupied bandwidth is small relative to the desired signal occupied bandwidth, it can be or is acting as a Continuous Wave (CW)), Clipping (hard saturation of transmission media such as laser saturation in optical link).

A different algorithm is defined for each type of impairment, using selected groups (or samples) of the signal (received signal) out of the continuous flow of Soft Decision symbol value points (in I and Q components form). A collection of a sufficient number of data points has to be performed to have a statistical significance, such as between eight and sixteen thousands (8000 and 16000) points, preferably 8192, spread over sixty-four (64) (or two hundred and fifty-six (256)) symbol locations (or clusters) for QAM-64 (or QAM-256), i.e. one hundred and twenty-eight (128) (or thirty-two (32)) points within the boundaries for each symbol location. Each symbol location corresponds to a respective of the ideal values of the signal that are distributed around the origin of the constellation display. The symbols (or clusters) determine a plurality of rows and columns forming a square shape pattern. The latter defines different combinations of symbols corresponding to specific groups of received points referring to respective impairments.

Compression

Compression occurs in active devices where gain is not linear with amplitude, the large amplitude signals are not amplified as much as the low ones. On the constellation display it is typically shown as a shrinking of the outer portion. It is most visible in the four (4) outer corners that are shifted toward the center.

The following corresponding analysis algorithm is depicted in FIG. 1, for a QAM-64 constellation 20. It is to be noted that for clarity purposes, only the clusters 22 of the selected combination (or group) are shown with received points 24 in respective FIGS. 1 to 5.

A first group of sampled received points 24a corresponding to the clusters 22a of the four (4) outer corners combination is selected to calculate the average values (I & Q) for each of the four (4) clusters 22a, giving a "center of gravity" 26 for each cluster 22a. For each of these clusters, a vector 28 from the corresponding ideal symbol location 30 (center) to the average value is calculated. Then, a signed average of the four (4) radial components of these four (4) vectors 28, referenced to the center origin 32 of the constellation is calculated. The ratio of this signed average to the nominal distance from the origin to the outer corner ideal values 30 is a ratio of compression, it can be expressed in percent (%) or in decibel (dB).

I/Q Gain Imbalance

Complex modulation normally uses two (2) channels in quadrature in the modulation process (rarely in the demodulation). If the gain of the two (2) channels is not exactly the same it shows as a distortion of the constellation pattern 20, with a difference between the distribution of the points 24b along the vertical (quadrature) and horizontal (in-phase) axis. In an actual operating demodulator with the equalizer set to ON the picture is not as obvious.

The equalizer tends to maximize MER, i.e. to concentrate points 24 toward their ideal value symbol location 30. As the I/Q gain difference acts differently on both axis, the equalizer will tend to reduce the highest gain but at the same time reduces the lowest and vice versa. The equalizer hunts between two (2) conditions, reducing the highest gain and increasing the lowest. The effect is mostly noticeable on the outer symbols 22b at the periphery of the constellation 20.

The twenty-eight (28) (or sixty (60)) clusters 22b on the outer edge (or periphery) of the QAM-64 (or QAM-256) constellation 20 are then considered and analyzed for I/Q gain imbalance.

Figure 2:
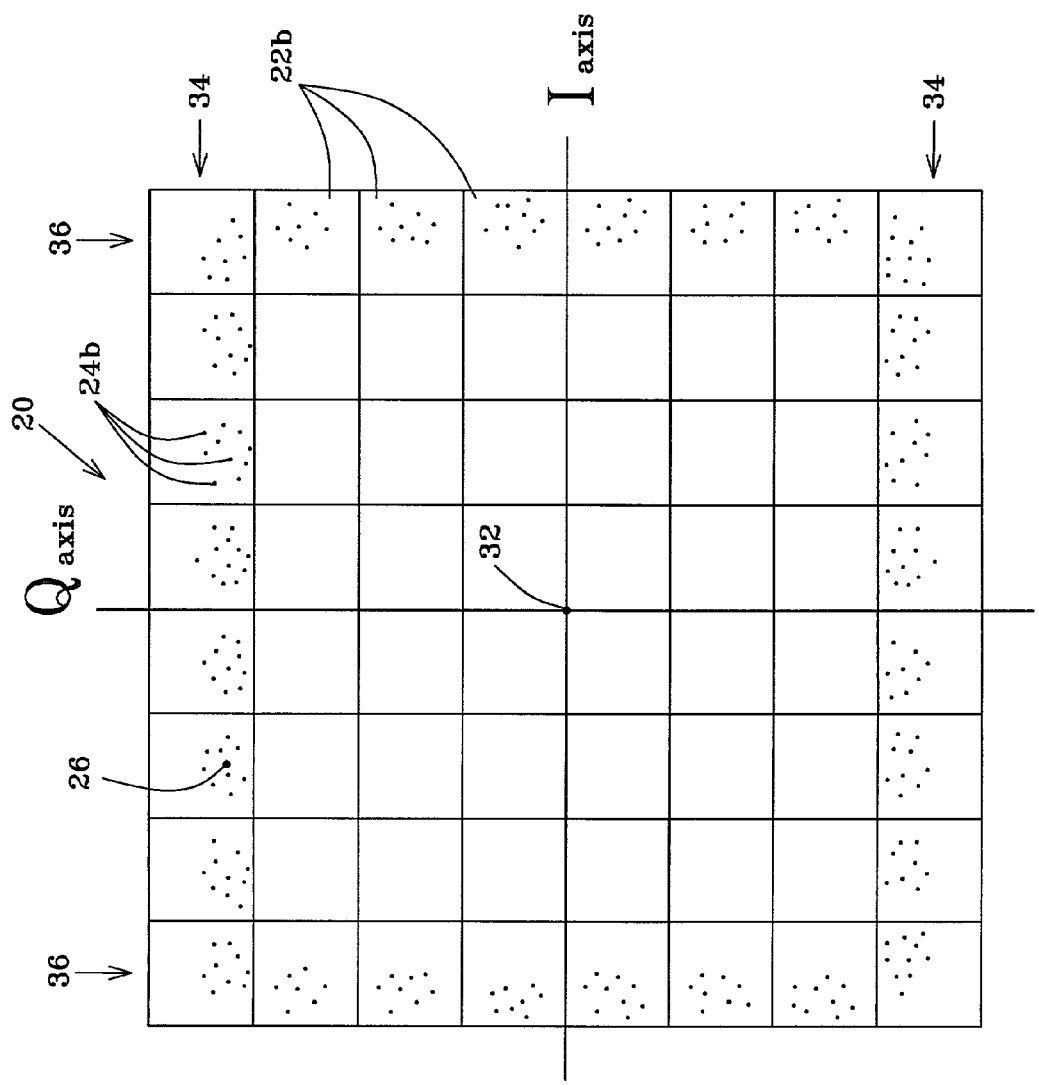
FIG. 2 is a view similar to FIG. 1 showing the received points corresponding to the group of thirty (30) ideal values related to the I/Q gain imbalance ratio impairment.

The following corresponding analysis algorithm is depicted in FIG. 2, for a QAM-64 constellation 20.

Once the signal has been acquired and the equalizer has settled close to optimum, the equalizer is "frozen" to prevent further hunting and a second group of sampled received data points 24b are collected.

The points 24b of the second group correspond to the twenty-eight (28) (or sixty (60)) clusters 22b of the four (4) outer rows 34 and columns 36 clusters combination.

A "center of gravity" 26 components for each cluster 22b is determined by averaging the components of the corresponding points 24b in each horizontal and vertical axis.

A I-horizontal signed average error in the I axis (horizontal) for the sixteen (16) (or thirty-two (32)) outer vertical columns 36 and a Q-vertical signed average error in the Q axis (vertical) for the outer sixteen (16) (or thirty-two (32)) outer horizontal rows 34 are then calculated.

The I/Q gain imbalance is equal to the ratio of the I-horizontal to the Q-vertical signed averages. The ratio can be expressed in dB or in %.

I/Q Phase Imbalance

Complex modulation normally uses two (2) channels in quadrature in the modulation process (seldom in the demodulation), if the phase difference between the two (2) carriers is not exactly ninety (90) degrees, the constellation 20 is shifted from a square into an inclined parallelogram.

The equalizer tends to maximize MER, i.e. to concentrate points 24 toward their ideal value symbol location 30. As the I/Q phase imbalance acts differently on both axis, the equalizer will tend to reduce the shift phase on I carrier but at the same time it will shift on the Q carrier and vice versa. The equalizer hunts between two (2) conditions.

The same twenty-eight (28) (or sixty (60)) clusters 22b on the outer edge of the QAM-64 (or QAM-256) constellation 20 are analyzed for I/Q phase imbalance.

Figure 3:
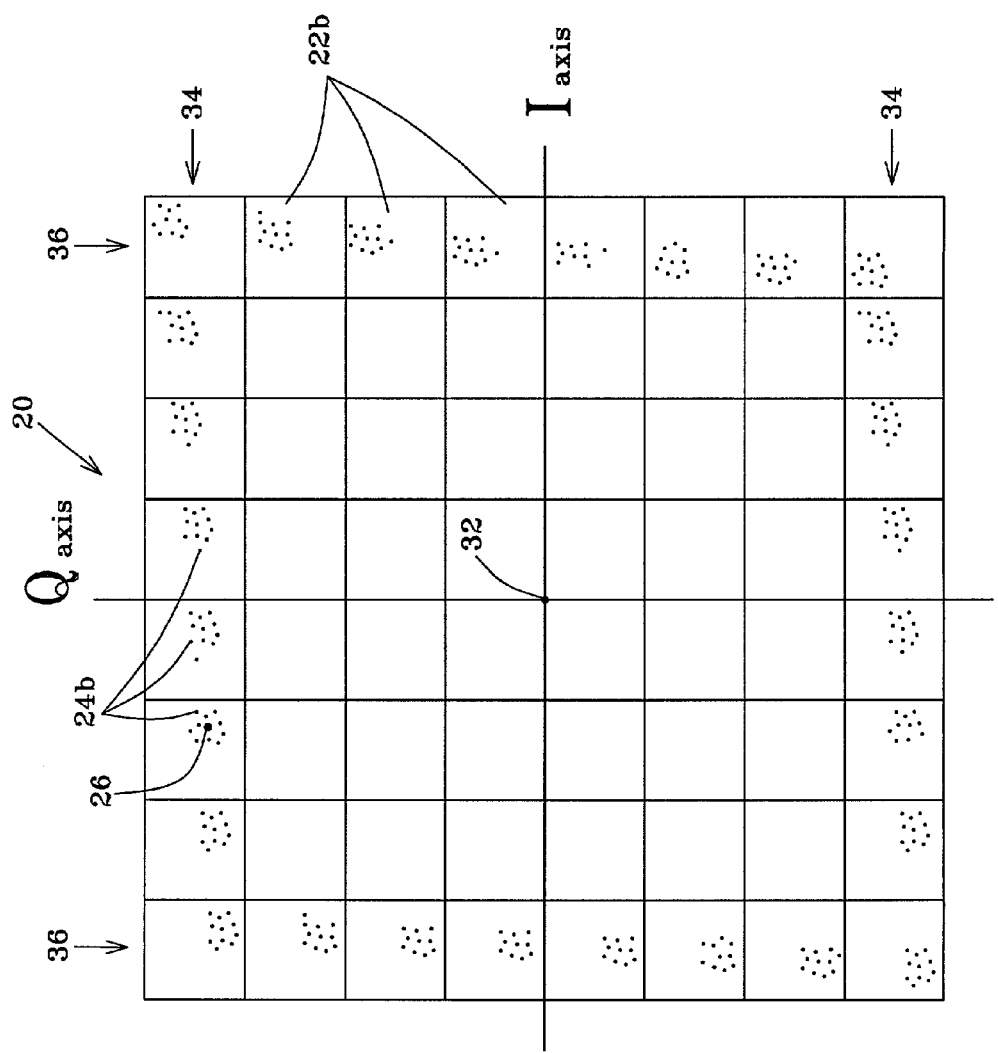
FIG. 3 is a view similar to FIG. 2 related to the I/Q phase imbalance impairment.

The following corresponding analysis algorithm is depicted in FIG. 3, for a QAM-64 constellation 20.

Considering the same selection of the second group of points 24b, a Q-horizontal signed average error in the I axis (horizontal) for the sixteen (16) (or thirty-two (32)) outer horizontal rows 34 and a I-vertical signed average error in the Q axis (vertical) for the outer sixteen (16) (or thirty-two (32)) outer vertical columns 36 are then calculated.

The I/Q phase imbalance is derived from the ratio of the I-vertical to the Q-horizontal signed averages. The ratio is generally expressed in degrees or radians with the arctangent function.

Phase Noise

When either the modulator carrier or any oscillator in a frequency conversion in the transmission path has some phase jitter, it will induce a rotation of the whole constellation pattern 20 around its center origin 32. It shows up mostly in the outer rows 34 and columns 36 of the constellation 20. The received points 24c of the four (4) outer corners clusters 22c form an elongated shape at forty-five degrees (45°), tangential (i.e. perpendicular) to a radial line from the origin 32. The received points 24c' of the two (2) middle clusters 22c' on the four (4) outer rows 34 and columns 36 form an elongated shape also tangential to the origin 32.

The received points 24c,24c' of this twelve (12) cluster 22c,22c' combination form a third group that is analyzed for phase noise.

Figure 4A:
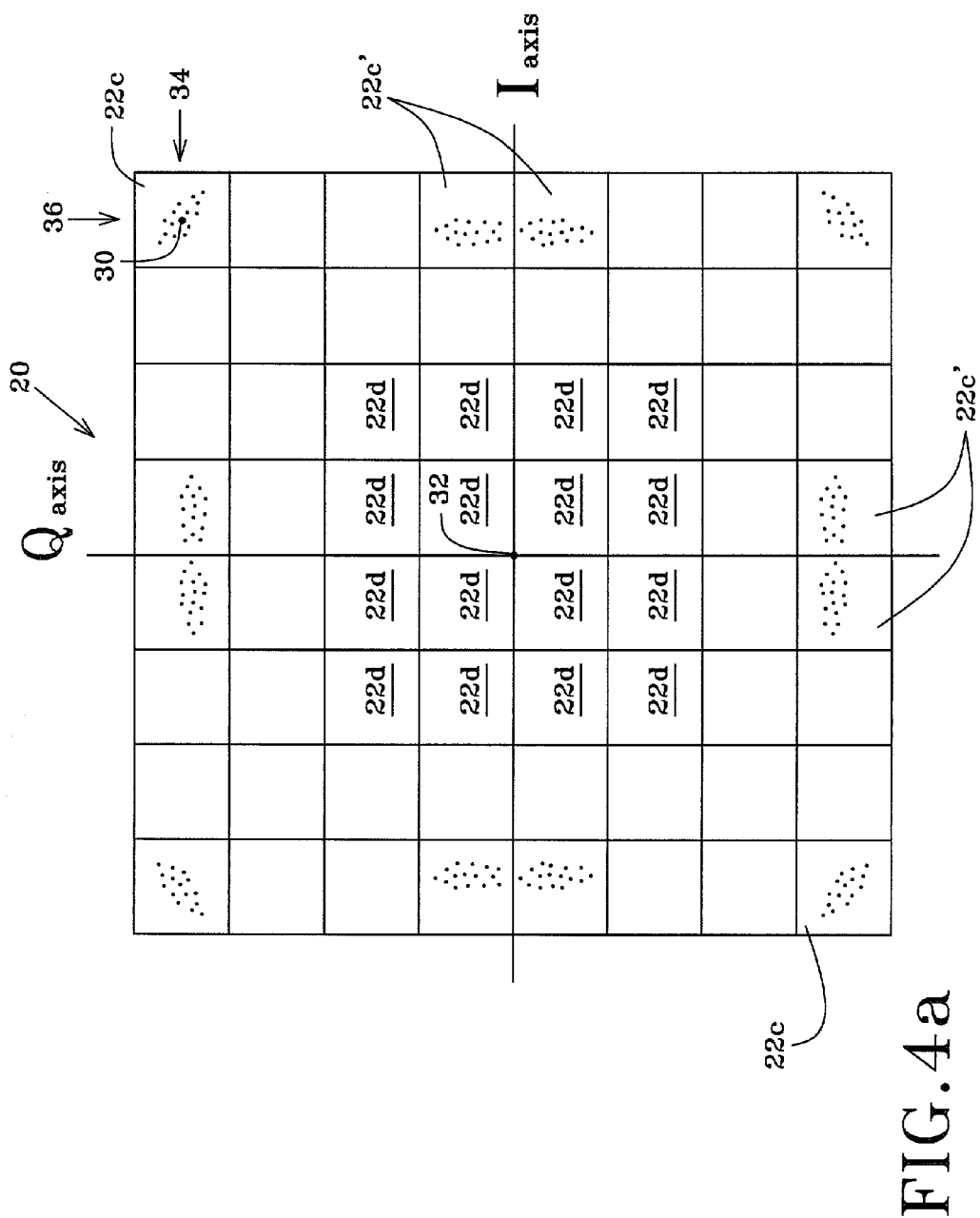
FIG. 4a is a view similar to FIG. 1 showing the received points corresponding to the group of twelve (12) ideal values related to the phase noise impairment.

The following corresponding analysis algorithm is depicted in FIGS. 4a and 4b, for a QAM-64 constellation 20.

For each of the twelve (12) clusters 22c,22c', a "center of gravity" 26 is determined by the average of all respective received points 24c,24c'. Then the received points 24c of each outer corner symbol 22c are split in four (4) subgroups by two vertical 38 and horizontal 39 lines intersecting each other at its center of gravity 26. Similarly, the received points 24c' of each middle symbol 22c' are split in four (4) subgroups by two perpendicular lines 40,41 respectively at a forty-five degree (45°) angle from the in-phase and quadrature directions and intersecting each other at its center of gravity 26, as shown in FIG. 4b.

A subgroup average 27,27' is calculated for each one of the four (4) subgroups of each cluster 22c,22c'. These four (4) subgroup averages 27,27' form two substantially tangential and radial segments 42,43 having a respective length difference.

Then, a total average of all twelve (12) length differences is calculated with the eight (8) length differences from the middle clusters 22c' are weighted up by a square root of two (1.4142) factor. This total average is divided by the distance from the ideal center 30 of one of the corner clusters 22c to the origin 32 of the constellation 20. This is the ratio of the average peak-to-peak phase noise to the amplitude of the signal. It can be expressed in % or dB, or using the arctangent function, it can be given in degrees or radians.

Noise or Wide Band Interferer

Thermal noise, quantizing noise or other similarly wide band noise with a relatively flat Power Density Function (PDF) is always added to the source signal in the transmission channel. It adds up independently of the symbols and then has an equal effect over all of the constellation points 24/clusters 22. Similarly, an interferer that is wide band and noise-like adds up and is indistinguishable from thermal noise. This type of interferer may be, but not limited to, another QAM channel with same signal bandwidth or intermodulation from various other wide band signals.

The previous four (4) disturbances/impairments (compression, I/Q gain, I/Q phase and phase noise) were more pronounced on the outer portion of the constellation 20 and consequently the groups of sampled received points 24 were selected from symbols 22 on the outer portion of the constellation 20. As noise effect is the same across the constellation, and the four (4) previous disturbances less pronounced around the origin 32, a combination of the innermost symbols 22d at the center origin 32 of the constellation 20 is selected and analyzed. For instance, a fourth group of the received points 24d of the sixteen (16) (or sixty-four (64)) innermost (and centermost) symbols 22d (4×4 or 8×8) are used in QAM-64 (or QAM-256) signals.

Figure 6:
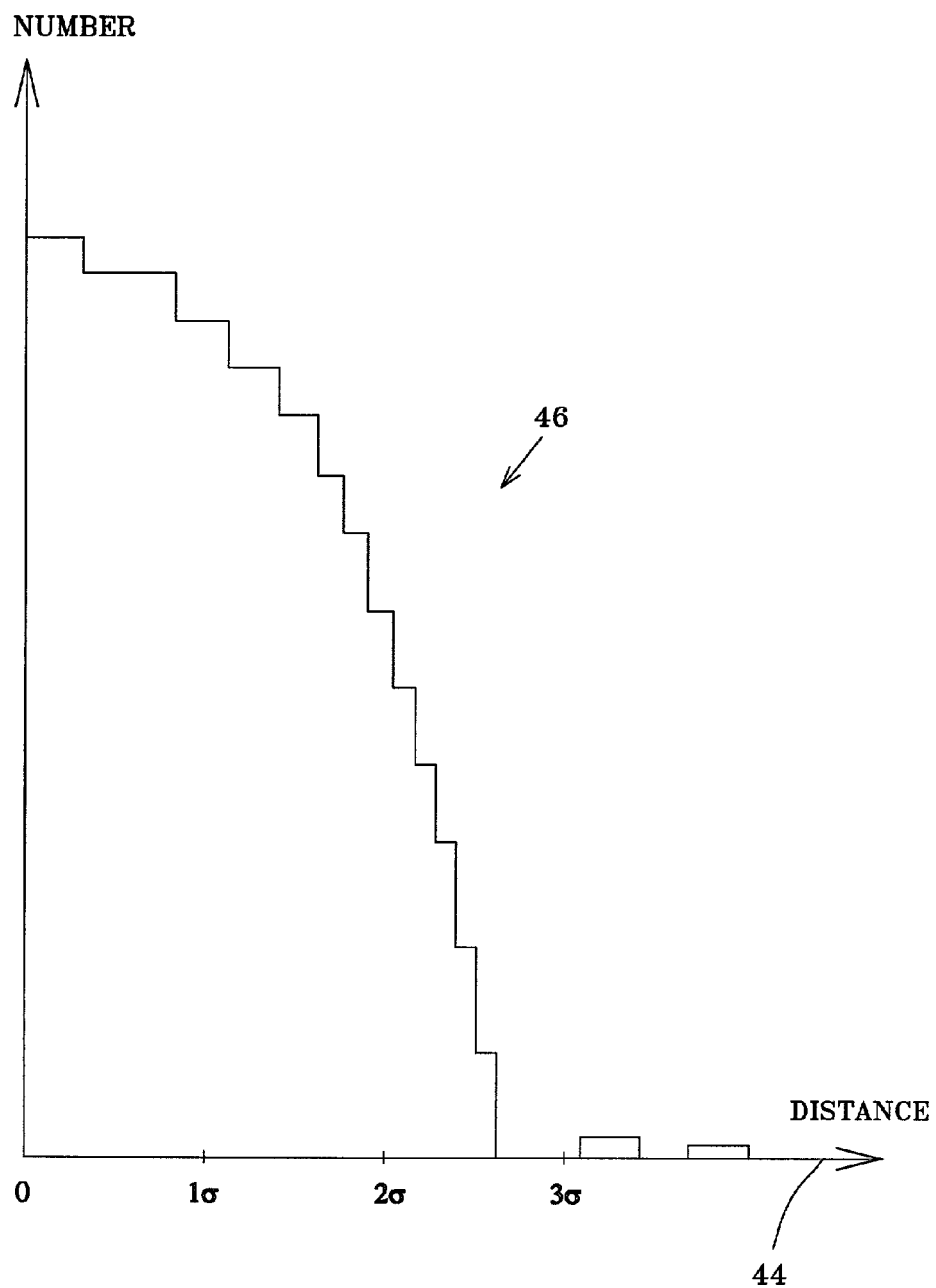
FIG. 6 is a histogram representation of the distances of all of the received points of FIG. 5 showing a distribution subjected to a wide band noise only.

The following corresponding analysis algorithm is depicted in FIGS. 5 and 6.

For each of the selected received points 24d of the group, the distance 44 of the same to its respective ideal value symbol center 30 is calculated (see FIG. 5) and a histogram 46 (see FIG. 6) of the distribution of these distances 44 is generated. For wide band interference, the highest density point should be at distance zero (0), but in real life, it is at some offset because of narrow band interference. Consequently, a common algorithm described below is used to extract noise or wide band as well as narrow band interference.

Narrow Band or CW Interferer

A narrow band interferer is a signal whose occupied bandwidth is significantly smaller than the signal bandwidth (approximately <1/20th). It could be a CW or coherent distortions such as Composite Triple Beat or Composite Second Order products in a cable system. Their narrow band characteristic makes them a coherent addition to the desired signal such that it appears as an amplitude offset to the ideal symbol location but with a rotating phase shift. On the constellation pattern 20, it is represented as a "Doughnut" cluster 22d with lesser density in the center and a maximum density in a circle around the center 30. As for noise, the effect is the same on all symbols 22, and for the same reasons as for noise, the same fourth group of received points 24d from the central portion of the constellation 20 are considered.

Figure 7:
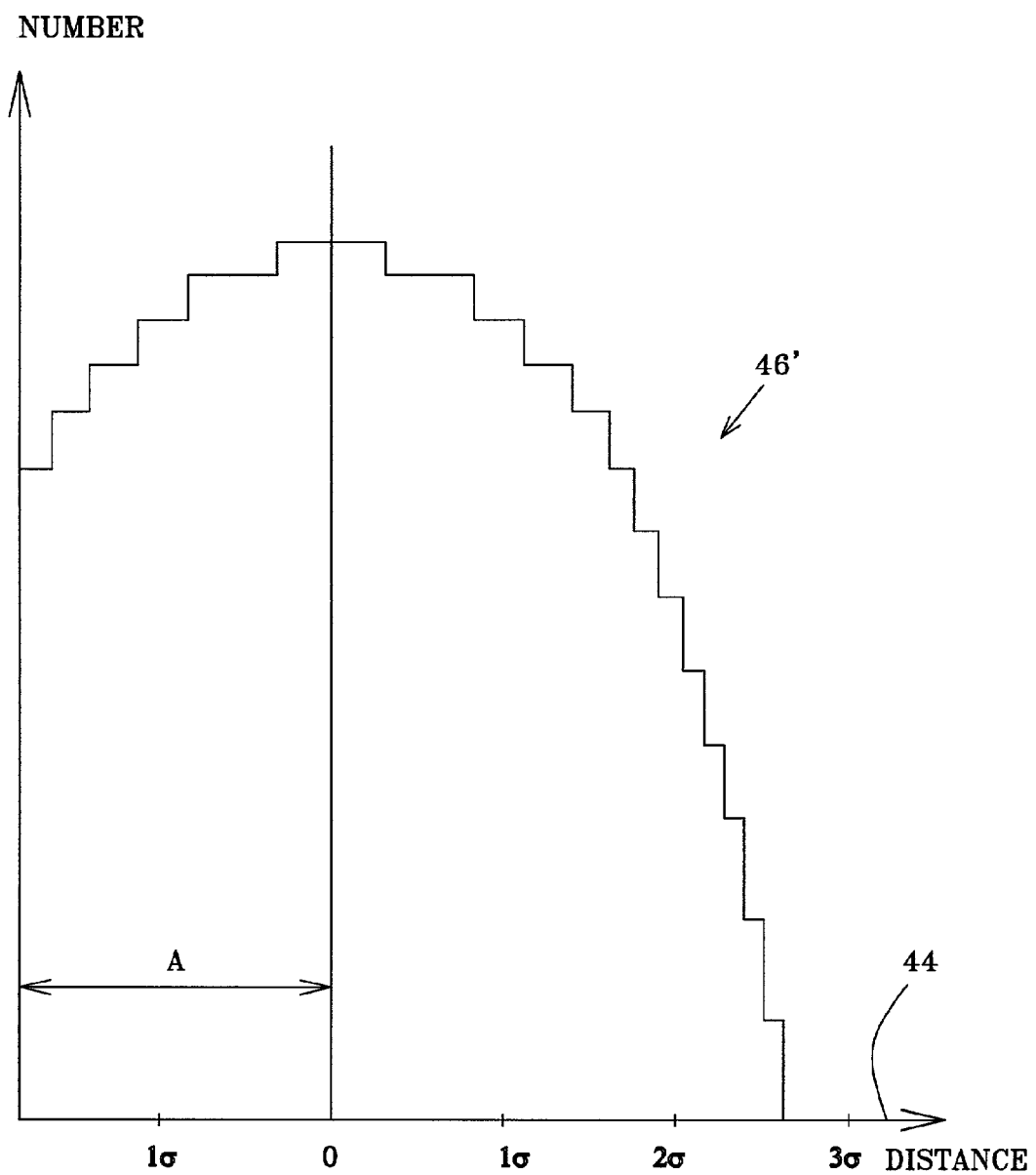
FIG. 7 is a histogram similar to FIG. 6 related to both wide and narrow band noises.

The following corresponding analysis algorithm is depicted in FIGS. 5 and 7.

Using the histogram 46' (see FIG. 7) generated above, both wide band and narrow band interference are analyzed together.

Noise or noise-like interference has a "normal" distribution, i.e. it can be characterized by the standard deviation ($\sigma$). As well known in the art, the 1$\sigma$ deviation includes 68% of all samples, 2$\sigma$ includes 95% of all samples, 3$\sigma$ will include 99% of all samples.

The 1$\sigma$ deviation is the Root Mean Square (RMS) noise amplitude.

On the other hand the narrow band interference causes a displacement of the normal distribution off from the zero distance center.

As the histogram 46' gives a distribution of the distance 44 of the received points 24d from their respective ideal value center 30 regardless of angle, the superposition of wide band and narrow band dispersion distorts the normal distribution. If there was a large narrow band relative to wide band, there would be a normal "bell" shaped distribution (wide band noise defined by $\sigma$) whose peak value is offset by the amplitude "A" of the narrow band interference.

As "A" is reduced relative to $\sigma$, portion of the "skirt" of the bell would have a negative value and is effectively folded over around the zero distance axis; down to a point where "A" is zero (0) and the first half of the bell curve is folded over the other half.

The algorithm purpose is to extract $\sigma$ and "A" from the actual histogram 46' generated with the received points 24d.

Although various mathematical functions could be used, the one described herein below is preferred as relatively simple for implementation in an instrument with regard to programming simplicity and speed of execution.

A set of predetermined histograms are pre-calculated by varying both $\sigma$ and "A"; they can easily be provided in a matrix of $\sigma$ vs. "A"; of 8×8 size for example.

Then the signal driven histogram 46' is preferably compared with Least Mean Square (LMS) calculation to those in the matrix to get the best match values.

The Mean Square values calculated in the $\sigma$ and "A" axis of the matrix from the best match values are preferably smoothed with cubic spline function, and the minimum is preferably linearly interpolated giving the true $\sigma$ and "A" of the signal driven histogram 46'.

The ratios of the $\sigma$ and "A" to the average amplitude of the signal provide the signal to noise ratio and the signal to interference ratio. The average signal amplitude is 0.65 of the peak value for QAM-64 or 0.62 for QAM-256. The ratios can be expressed in dB.

Clipping

In the transmission channel, clipping or hard limitation creates large errors that are independent of the other disturbances/impairments. Clipping can occur when a laser saturates, for example. It occurs with a similar fashion on all symbols/clusters of the constellation, so for the same reasons as with noise and CW, the same fourth group of received points 24d from the innermost symbols 22d combination of the constellation 20 are considered.

Received points 24d disturbed by clipping are located anywhere within the boundaries of each cluster 22d, and do not follow a normal distribution with or without narrow band offset. Consequently, the probability of occurrence of clipping can be derived when a significant number of data points 24d (i.e. distances) in the histogram 46" do not fall within the normal distribution.

Figure 8:
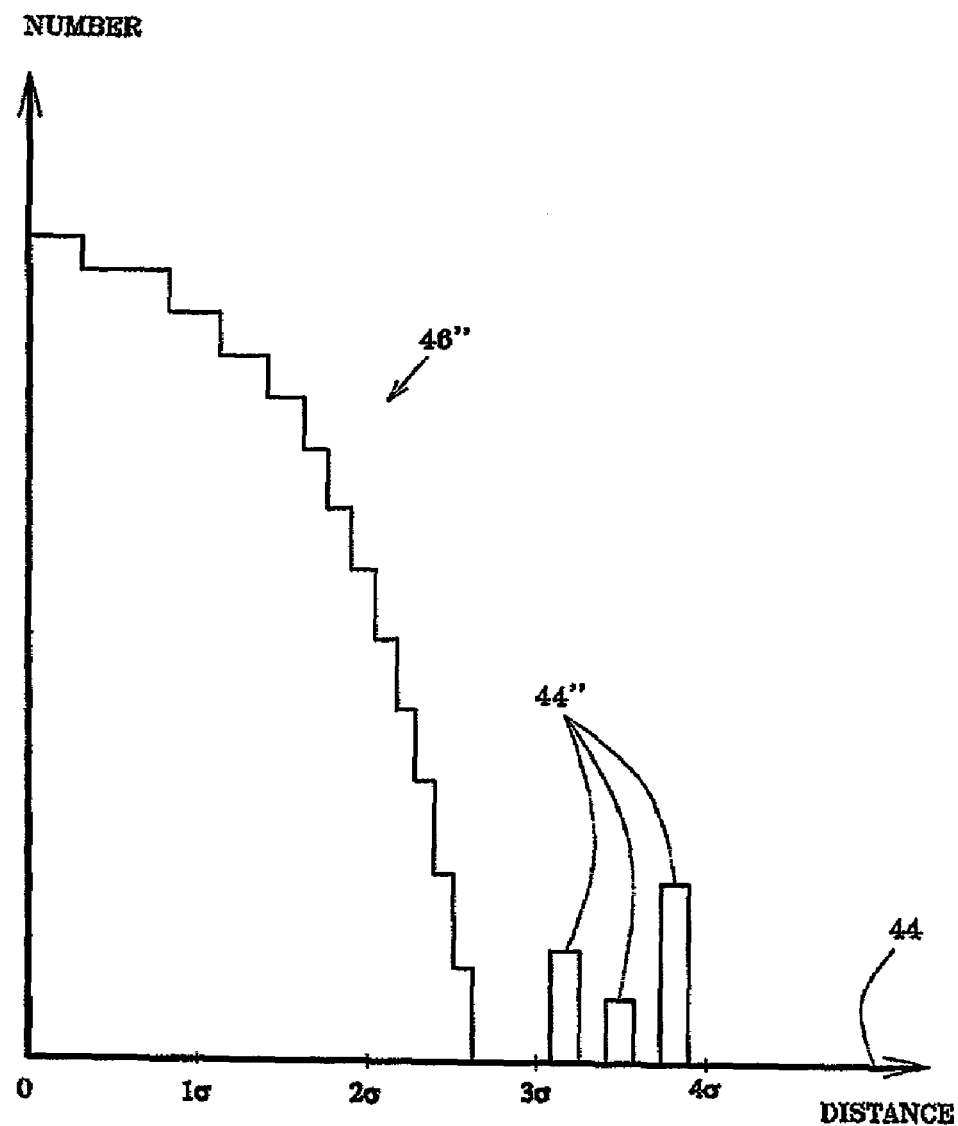
FIG. 8 is a histogram similar to FIG. 6 related to both wide band noise and clipping.

The following corresponding analysis algorithm is depicted in FIGS. 5 and 8.

When pre-calculating the matrix of histograms of $\sigma$ vs. "A", the Cumulative Probability of Occurrence (CPO) outside of 2$\sigma$ and the distance from center corresponding to 2$\sigma$ are also calculated.

Using the histogram 46" generated in the noise and narrow band algorithm, the number of data points 24d of distances 44" larger than this 2$\sigma$ distance are cumulated and compared to the CPO calculated value (see FIG. 8).

If the actual number is between twice and four (4) times the CPO calculated value, "Clipping likely" is declared, if the number is between four (4) and eight (8) times the CPO value "Clipping" is declared, and if the number is larger than 8 times the CPO value "Severe clipping" is declared.

Real Baud Rate

Digital modulation is a continuous process of changes from one symbol (or modulation code) to the next through a trajectory. As consecutive symbols are apparently random so are trajectories, it is not obvious how to "count" the real symbol rate with high accuracy.

Digitally modulated signals are usually comprised of the payload (user data) plus some channel coding, i.e. additional bits and/or symbols used for transmission errors detection and correction or for "framing" of the payload. Consequently, there is a larger effective bit rate in the transmission channel (channel coding effect) than at the user interface (payload). But for each specific coding representing a signal, there is a known relationship between the two.

The proposed method, in the case of a CATV system using ITU J83 Annex A, B or C format, is to count in the Motion Picture Expert Group (MPEG) payload stream the word rate over a sufficiently long period i.e. an order of magnitude of one second substantially, and use the specific coding relationship to calculate the real channel bit rate and consequently the RBR (real baud rate) with the accuracy of the counter time base i.e. 1 ppm (part per million). All operating parameters associated with a signal are provided by and extracted from a signal demodulator since they are available from the same, preferably located within the receiver.

The user bit rate is eight (8) times the MPEG word rate. As for example, for the specific case of J83 Annex B in QAM-256, the ratio of the channel bit rate and user bit rate is related to: the trellis coding 20/19, the FEC frame length of sixty (60) packets of 128 symbols of seven (7) bits, FEC frame trailer of forty (40) bits, the Reed-Solomon FEC of 128/122, hence bit rate ratio is 1.104,960,613. As both constellation and MPEG words are eight (8) bits, the RBR and MPEG word ratio is also 1.104,960,613.

Real Carrier Frequency

A QAM signal is a suppressed carrier modulation, only information carrying sidebands are transmitted. Consequently it is difficult to measure the suppressed carrier. On the other hand, a carrier recovery mechanism is used for demodulation with a PLL, in analog form or in digital form. The nominal carrier frequency is a reference frequency for the PLL. The Loop correction value (together with the frequency/value relationship) is a measure of the real carrier, somewhat offset from nominal.

In the specific case of a CATV system and using a Broadcom BCM 3125 QAM receiver, the incoming signal is sampled (or often sub-sampled) for all digital demodulation. First an internal re-sampling (Sample Rate Conversion) is performed to recover the baud rate. From there the carrier is recovered in relation to the actual baud rate. This recovery uses a numerically controlled frequency generator whose output frequency is related to its clock (in this case the baud rate) by the product of: control word*$(1/2^{23})$*clock. The $2^{23}$ factor is the control word dimensional factor.

By reading and averaging the value of the control word, the carrier recovered frequency is calculated.

Equalizer Frequency and Delay Response

The equalizer is a time linear filter, using past and future samples (relative to the reference sample) that are added to the reference sample through complex multipliers. Normally the coefficients of the multipliers are adaptively determined to minimize the Inter-Symbol Interference. This effectively compensates for linear distortions of the signal such as frequency response, phase response and reflections.

The proposed method of the signal parameters measurement system comprises the reading of the complex coefficients of the equalizer, from these and using known techniques in the art (such as Fast Fourier Transforms (FFT) and the like), the method calculates the amplitude and phase vs. frequency responses of the filter and the group delay from the phase responses, to finally display on the screen of the instrument the amplitude and group delay for the operator to interpret channel signal parameters.

Also a quantitative equalizer activity factor is preferably displayed. The latter is the linear summations of the polar amplitude of all equalizer coefficients less the reference one, and can be displayed either as in a linear percent (%) form or a logarithmic (dB) scale.

Hum On Digital Signals

Hum or low frequency disturbances is a low frequency amplitude modulation of signals. It is most frequently caused by power line related problems (power supplies and the like). It is then a disturbance having frequency and its first harmonics of the power line related problem.

In the analog modulation there are well established methods of measurement either in-service or out-of-service. These methods rely on the detection of very small amplitude modulation of the signal at least at reference points in time (analog TV in-service).

In the case of digital modulation there is no amplitude references.

But in the case of embodiment for high order QAM, the average power is constant (less the hum modulation), baud variations are much faster, in the order of few MHz, than power line frequency of 60 or 50 Hz and its first harmonics less than 1 kHz.

Figure 9:
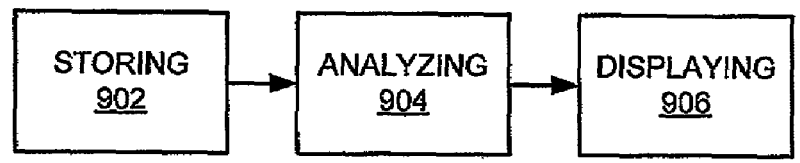
FIG. 9 is a flow chart 900 of a method for detecting and quantifying impairments of a received communication signal of a quadrature amplitude modulation data communication system represented by a plurality of ideal values.

Referring now to FIG. 9. according to one aspect of the present invention, there is provided a method 900 for detecting and quantifying impairments of a received communication signal of a quadrature amplitude modulation data communication system represented by a plurality of ideal values, said method comprises the steps of:

a) storing 902 a statistically significant number of a plurality of received points of said signal for each of said ideal values corresponding to a plurality of groups of said plurality of ideal values, each of said received points being defined by an in-phase and a quadrature components in a coordinate system in which a first axis is an in-phase axis and a second axis is a quadrature axis, said components having corresponding ideal components from their respective of said ideal values, each of said groups corresponding to a respective of said impairments and being specific to the same;

b) analyzing 904 said components of said received points of respective of said groups in relation with their respective of said ideal components of said ideal values to quantify said impairments of said signal and provide calculated values of the same; and c) displaying 906 said calculated values of said impairments.

The proposed method is to use spectrum analyzer functionality to sample the signal amplitude with a resolution bandwidth of the same order of magnitude as the signal (i.e. 1 or 3 MHz) for the 6 MHz signal, but a small video bandwidth (1 kHz); to trigger the sampling sequences to the power line and apply averaging preferably over between twenty (20) and two hundred (200) averages. By zooming onto the small amplitude modulation, a peak-to-peak modulation from one tenth (0.1%) of a percent to fifteen percent (15%) can be extracted.

Although embodiments of the invention have been illustrated in the accompanying drawing and described in the foregoing detailed description, it will be understood that the invention is not limited to the embodiments disclosed, but is capable of numerous rearrangements, modifications, and substitutions without departing from the scope of the invention.

We claim:

1. A method for detecting and quantifying impairments of a received communication signal of a quadrature amplitude modulation (OAM) data communication system represented by a plurality of ideal values, said method comprising the steps of:
   a) storing a statistically significant number of a plurality of received points of said signal for each of said ideal values corresponding to a plurality of groups of said plurality of ideal values, wherein said plurality of ideal values being distributed around an origin of said coordinate system in a plurality of adjacent rows and columns forming a square shape pattern, said rows and columns being in a direction of said in-phase axis and said quadrature axis respectively, said pattern defining four outer corner ideal values, external horizontal and vertical ideal values of said two outermost of said rows and two outermost of said columns respectively, internal ideal values in a center proximity of said origin, different combinations of said received points corresponding to respective of said defined ideal values forming said plurality of groups, each of said received points being defined by an in-phase and a qadrature components in a coordinate system in which a first axis is an in-phase axis and a second axis is a quadruture axis, said components having corresponding ideal components from their respective of said ideal values, each of said groups corresponding to a respective of said imparments and being specific to the same wherein said impairments are selected from a group including signal compression ratio. I/O gain imbalance ratio, I/O phase imbalance, phase noise, signal to noise ratio, signal to interference ratio and clipping level;
   b) analyzing said components of said received points of respective of said groups in relation with their respective of said ideal components of said ideal values to quantify said impairments of said signal and provide calculated values of the same;
   c) displaying said calculated values of said impairments.

2. A method as defined in claim 1, further comprising, after step c), the following step of:
   d) storing said calculated values of said impairments, thereby allowing an unmanned monitoring of said communication signal.

3. A method as defined in claim 1, wherein said received points corresponding to respective of said four outer corner ideal values forming a first of said plurality of groups corresponding to said signal compression ratio impairment, said method, further comprising, after step b), the step of:
   b1) determining for each of said four outer cower ideal values an average received point from the corresponding of said plurality of received points, a radial component of a vector going from corresponding of said outer corner ideal value to the corresponding average received point, and a signed average of said radial components, the ratio of the latter to a nominal distance from said origin to one of said outer corner ideal value being said signal compression ratio of said signal.

4. A method as defined in claim 3, wherein said received points corresponding to respective of said external horizontal and vertical ideal values forming a second of said plurality of groups corresponding to said I/Q gain imbalance ratio impairment, said method, further comprising, after step b1), the steps of:
   b2) determining for each of said external vertical ideal values an average received point from the corresponding of said plurality of received points, an ia-phase component of a vector going from corresponding of said external vertical ideal value to the corresponding average received point, and a signed average of said in-phase components;
   b3) determining for each of said external horizontal ideal values an average received point from the corresponding of said plurality of received points, a quadrature component of a vector going from corresponding of said external horizontal ideal value to the corresponding average received point, and a signed average of said quadrature components, a ratio of said signed average of said in-phase components to said signed average of said quadrature components being said I/Q gain imbalance ratio of said signal.

5. A method as defined in claim 4, wherein said received points corresponding to respective of said external horizontal and vertical ideal values forming a second of said plurality of groups corresponding to said I/Q phase imbalance impairment, said method, further comprising, after step b3), the steps of:
   b4) determining for each of said external horizontal ideal values an average received point from the corresponding of said plurality of received points, an in-phase component of a vector going from corresponding of said external horizontal ideal value to the corresponding average received point, and a second signed average of said in-phase components;
   b5) determining for each of said external vertical ideal values an average received point from the corresponding of said plurality of received points, a quadrature component of a vector going from corresponding of said external vertical ideal value to the corresponding average received point, and a second signed average of said quadrature components, a ratio of said second signed average of said quadrature components to said second signed average of said in-phase components being a tangent value of said I/Q phase imbalance of said signal.

6. A method as defined in claim 5, wherein said received points corresponding to respective of said four outer corner ideal values and two middle of each of said external horizontal and vertical ideal values forming a third of said plurality of groups corresponding to said signal phase noise impairment, said method, further comprising, after step b5), the steps of:
   b6) determining for each of said four outer corner ideal values four sub-avenge received points of four sub-groups from the corresponding of said plurality of received points, said four subgroups dividing the corresponding of said plurality of received points into four adjacent areas divided by two perpendicular lines respectively parallel to said in-phase and quadrature axis and intersecting each other at an average received point of the corresponding of said plurality of received points, said four sub-average received points forming two substantially tangential and radial segments of a respective ellipse having a respective length difference;

b7) determining for each of said middle ideal values four second sub-average received points of four second subgroups from the corresponding of said plurality of received points, said four second subgroups dividing the corresponding of said plurality of received points into four adjacent areas divided by two perpendicular lines respectively at a forty-five degree (45°) angle from said in-phase and quadrature axis and intersecting each other at a second average received point of the corresponding of said plurality of received points, said four second sub-average received points Conning two substantially tangential and radial second segments of a respective ellipse having a respective second length difference, and a total average of all of said length and second length differences with said second length differences being increasingly weighted by essentially a square root of two factor, a ratio of said total average to the distance of one of said four corner ideal values to said origin being said phase noise of said signal.

7. A method as defined in claim 6, wherein said received points corresponding to respective of said innermost ideal values forming a fourth of said plurality of groups corresponding to bath said signal to noise ratio and signal to interference ratio impairments, said method, further comprising, after step b7), the steps of:

b8) determining for all of said innermost ideal values a distance between said plurality of received points and its corresponding of said innermost ideal values, a histogram distribution of said distances which substantially follows a normal distribution, and an average signal amplitude being an average of all distances of each of said plurality of said ideal values of said signal to said origin;

b9) statistically determining best match values of said histogram distribution with a plurality of predetermined standard deviations and offsets of a peak of a respective normal distribution from a zero distance to determine a true standard deviation ($\sigma$) and a true offset (A) by interpolating between said predetermined standard deviations and offsets around said best match values, ratios of said true standard deviation and said true offset to said average signal amplitude being said signal to noise ratio and said signal to interference ratio impairment of said signal respectively.

8. A method as defined in claim 7, wherein in step b9) said best match values being statistically determined using a least mean square method, and said true standard deviation and true offset being determined using linear interpolation method.

9. A method as defined in claim 7, wherein said fourth of said plurality of groups also corresponding to said clipping level impairment, said true standard deviation ($\sigma$) and true offset (A) corresponding to a true normal, distribution, said method, further comprising, after step b9), the step of:

b10) determining a cumulative probability of occurrence of said distances being larger than a two true standard deviation (2$\sigma$) distance from a center of said true distribution, a true quantity of said occurrence, and a clipping ratio of said true quantity to said cumulative probability of occurrence, said clipping level being "clipping likely", "clipping" and "severe clipping" upon said clipping ratio between two and four, four and eight and larger than eight respectively.

10. A method as defined in claim 9, wherein said signal being represented by a specific coding, said signal parameters are selected from a group including real band rate, real carrier frequency, amplitude and group delay response, and low frequency disturbance (hum), said method further detecting and quantifying said signal parameters, said method further comprising, after step c), the steps of:

d) storing a statistically significant number of a plurality of operating parameters available and extracted from a signal demodulator of a receiver of said signal;

e) analyzing said plurality of operating parameters to quantify said signal parameters of said signal and provide calculated values of the same;

f) integrally displaying said calculated values of said signal parameters.

11. A method as defined in claim 9, wherein said method being non-intrusive of said signal an adapted for an in-field signal detection at a receiver end of said data communication system, said statistically significant number being between eight thousand and sixteen thousand.

12. A method for detecting and quantifying parameters of a received communication signal of a quadrature amplitude modulation data communication system represented by a specific coding, said signal parameters are selected from a group including real baud rate, real carrier frequency, amplitude and group delay response, and low frequency disturbance (hum) said method comprising the steps of:

a) storing a statistically significant number of a plurality of operating parameters available and extracted from a signal demodulator of a receiver of said signal;

b) analyzing said plurality of operating parameters to quantify said signal parameters of said signal and provide calculated values of the same further comprising:

b1) counting a MPEG (Motion Picture Expert Group) stream word rare over a specific time duration of an order of magnitude of one second from said plurality of operating parameters;

b2) determining a signal user bit rate and consequently said real baud rate parameter of said signal using said MPEG word rate and said specific coding, said real baud rate impairment being accurate within an accuracy of a counter time base of said demodulator;

wherein said operating parameters include a control word and a control word dimensional factor, said method further comprising, the steps of:

b3) performing a re-sampling of said operating parameters to recover an actual baud rate of said signal;

b4) determining said real carrier frequency parameter of said signal from said actual baud rate using a numerically controlled frequency generator having an output frequency being related to said actual baud rate by multiplying the latter (actual baud rate) by an average of said control word and dividing by said control word dimensional factor; and wherein said signal being filtered by an equalizer of said receiver of said data communication system to compensate for linear distortions of said signal using complex coefficients, said distortions being frequency responses, phase responses and reflections, said operating parameters further include said complex coefficients from said equalizer, said method further comprising the step of:

b5) determining said amplitude and group delay response parameter of said signal by calculating an amplitude and a phase from said frequency responses and a group delay from said phase responses of said equalizer respectively using said complex coefficients, wherein said signal being related to a power line, said method further comprising the steps of:

b6) synchronizing a spectrum analyzer to said power line having a frequency and first harmonics being order of magnitude less than a frequency of said signal;

b7) sampling sequences of an amplitude of said signal with a resolution bandwidth of a same order of magnitude as said signal using a typical functionality of said spectrum analyzer;

b8) triggering said sequences to said frequency and first harmonics of said power line and averaging the same;

b9) determining said low frequency disturbance (hum) parameter of said signal by zooming on small amplitude modulation of said averaging to extract a peak-re-peak modulation; and c) integrally displaying said calculated values of said signal parameters.

13. A method as defined in claim 12, wherein said peak-to-peak modulation varies between one tenth (0.1) of a percent and fifteen (15) percent.

14. A method as defined in claim 13, wherein said method being non-intrusive of said signal an adapted for an in-field signal detection at said receiver, said statistically significant number being between twenty (20) and two hundred (200).

* * * * *

UNITED STATES PATENT AND TRADEMARK OFFICE
CERTIFICATE OF CORRECTION

PATENT NO. : 7,142,609 B2
APPLICATION NO. : 09/841837
DATED : November 28, 2006
INVENTOR(S) : Terreault et al.

It is certified that error appears in the above-identified patent and that said Letters Patent is hereby corrected as shown below:

Column 14
    Line 36, delete the following that begins with "Referring now to FIG. 9. according to one aspect...", and ends with "(15%) can be extracted.," on column 15, line 3, and insert the following:

--The proposed method is to use spectrum analyzer functionality to sample the signal amplitude with a resolution bandwidth of the same order of magnitude as the signal (i.e. 1 or 3 MHz) for the 6 MHz signal, but a small video bandwidth (1 kHz); to trigger the sampling sequences to the power line and apply averaging preferably over between twenty (20) and two hundred (200) averages. By zooming onto the small amplitude modulation, a peak-to-peak modulation from one tenth (0.1%) of a percent to fifteen percent (15%) can be extracted.

Referring now to FIG. 9, according to one aspect of the present invention, there is provided a method 900 for detecting and quantifying impairments of a received communication signal of a quadrature amplitude modulation data communication system represented by a plurality of ideal values, said method comprises the steps of:

a) storing 902 a statistically significant number of a plurality of received points of said signal for each of said ideal values corresponding to a plurality of groups of said plurality of ideal values, each of said received points being defined by an in-phase and a quadrature components in a coordinate system in which a first axis is an in-phase axis and a second axis is a quadrature axis, said components having corresponding ideal components from their respective of said ideal values, each of said groups corresponding to a respective of said impairments and being specific to the same;

b) analyzing 904 said components of said received points of respective of said groups in relation with their respective of said ideal components of said ideal values to quantify said impairments of said signal and provide calculated values of the same; and c) displaying 906 said calculated values of said impairments.--

Column 15
    Claim 1, line 15, delete "(OAM)" and insert therefor -- (QAM)--
    Claim 1, line 34, delete "qadrature" and insert therefor -- quadrature--
    Claim 1, line 36, delete "quadruture" and insert therefor -- quadrature--
    Claim 1, line 40, delete "imparments" and insert therefor -- impairments--
    Claim 1, line 42, delete "compression ratio. I/O" and insert therefore -- compression ratio, I/Q--
    Claim 1, line 42, delete "I/O phase" and insert therefor -- I/Q phase--
    Claim 3, line 61, delete "cower" and insert therefor -- corner--

UNITED STATES PATENT AND TRADEMARK OFFICE
CERTIFICATE OF CORRECTION

PATENT NO. : 7,142,609 B2
APPLICATION NO. : 09/841837
DATED : November 28, 2006
INVENTOR(S) : Terreault et al.

It is certified that error appears in the above-identified patent and that said Letters Patent is hereby corrected as shown below:

Column 16
    Claim 4, line 11, delete "ia-phase" and insert therefore -- in-phase--
    Claim 6, line 59, delete "sub-avenge" and insert therefore -- sub-average--

Column 17
    Claim 6, line 13, delete "Conning" and insert therefore -- forming--
    Claim 7, line 25, delete "bath" and insert therefore -- both--

Column 18
    Claim 10, line 1, delete "band" and insert therefore -- baud--
    Claim 12, line 26, delete "(hum) said" and insert therefore -- (hum), said--
    Claim 12, line 36, delete "rare" and insert therefore -- rate--

Column 20
    Claim 12, line 3 and 4, delete "peak-re-peak" and insert therefore -- peak-to-peak--

Signed and Sealed this

Ninth Day of October, 2007

JON W. DUDAS
*Director of the United States Patent and Trademark Office*

UNITED STATES PATENT AND TRADEMARK OFFICE
CERTIFICATE OF CORRECTION

PATENT NO. : 7,142,609 B2
APPLICATION NO. : 09/841837
DATED : November 28, 2006
INVENTOR(S) : Terreault et al.

It is certified that error appears in the above-identified patent and that said Letters Patent is hereby corrected as shown below:

Column 14
  Line 36, delete the following that begins with "Referring now to FIG. 9. according to one aspect...", and ends with "(15%) can be extracted." on column 15, line 3, and insert the following:

-- The proposed method is to use spectrum analyzer functionality to sample the signal amplitude with a resolution bandwidth of the same order of magnitude as the signal (i.e. 1 or 3 MHz) for the 6 MHz signal, but a small video bandwidth (1 kHz); to trigger the sampling sequences to the power line and apply averaging preferably over between twenty (20) and two hundred (200) averages. By zooming onto the small amplitude modulation, a peak-to-peak modulation from one tenth (0.1%) of a percent to fifteen percent (15%) can be extracted.
  Referring now to FIG. 9, according to one aspect of the present invention, there is provided a method 900 for detecting and quantifying impairments of a received communication signal of a quadrature amplitude modulation data communication system represented by a plurality of ideal values, said method comprises the steps of:
  a) storing 902 a statistically significant number of a plurality of received points of said signal for each of said ideal values corresponding to a plurality of groups of said plurality of ideal values, each of said received points being defined by an in-phase and a quadrature components in a coordinate system in which a first axis is an in-phase axis and a second axis is a quadrature axis, said components having corresponding ideal components from their respective of said ideal values, each of said groups corresponding to a respective of said impairments and being specific to the same;
  b) analyzing 904 said components of said received points of respective of said groups in relation with their respective of said ideal components of said ideal values to quantify said impairments of said signal and provide calculated values of the same; and
  c) displaying 906 said calculated values of said impairments. --

Column 15
  Claim 1, line 15, delete "(OAM)" and insert therefor -- (QAM) --
  Claim 1, line 34, delete "qadrature" and insert therefor -- quadrature--
  Claim 1, line 36, delete "quadruture" and insert therefor -- quadrature--
  Claim 1, line 40, delete "imparments" and insert therefor -- impairments--
  Claim 1, line 42, delete "compression ratio. I/O" and insert therefor -- compression ratio, I/Q --
  Claim 1, line 42, delete "I/O phase" and insert therefor -- I/Q phase--
  Claim 3, line 61, delete "cower" and insert therefor --corner--

UNITED STATES PATENT AND TRADEMARK OFFICE
CERTIFICATE OF CORRECTION

PATENT NO. : 7,142,609 B2
APPLICATION NO. : 09/841837
DATED : November 28, 2006
INVENTOR(S) : Terreault et al.

It is certified that error appears in the above-identified patent and that said Letters Patent is hereby corrected as shown below:

Column 16
    Claim 4, line 11, delete "ia-phase" and insert therefor -- in-phase--
    Claim 6, line 59, delete "sub-avenge" and insert therefor -- sub-average--
Column 17
    Claim 6, line 13, delete "Conning" and insert therefor -- forming--
    Claim 7, line 25, delete "bath" and insert therefor -- both--
Column 18
    Claim 10, line 1, delete "band" and insert therefor -- baud--
    Claim 12, line 26, delete "(hum) said" and insert therefor -- (hum), said--
    Claim 12, line 36, delete "rare" and insert therefor -- rate--
Column 20
    Claim 12, line 3 and 4, delete "peak-re-peak" and insert therefor -- peak-to-peak--

Signed and Sealed this

Thirtieth Day of October, 2007

JON W. DUDAS
*Director of the United States Patent and Trademark Office*